United States Patent
Matsuoka

[11] Patent Number: 5,846,153
[45] Date of Patent: Dec. 8, 1998

[54] CLUTCH APPARATUS HAVING PLANETARY GEAR MECHANISM

[75] Inventor: Yoshihiro Matsuoka, Neyagawa, Japan

[73] Assignee: Exedy Corporation, Neyagawa, Japan

[21] Appl. No.: 782,230

[22] Filed: Jan. 13, 1997

[30] Foreign Application Priority Data

Jan. 31, 1996 [JP] Japan ...................................... 8-015803

[51] Int. Cl.$^6$ ...................................................... F16H 3/44
[52] U.S. Cl. .......................... 475/269; 475/317; 475/320; 475/207; 192/3.52
[58] Field of Search .................................... 475/269, 295, 475/296, 317, 320, 346, 347, 207; 192/30 V, 3.51, 3.52

[56] References Cited

U.S. PATENT DOCUMENTS

| | | | |
|---|---|---|---|
| 4,724,719 | 2/1988 | Werner et al. ..................... | 192/30 V X |
| 4,976,671 | 12/1990 | Andersson . | |
| 5,263,906 | 11/1993 | Antonov ............................... | 475/320 X |
| 5,267,917 | 12/1993 | Kadotani et al. .................... | 475/317 X |
| 5,478,290 | 12/1995 | Buuck et al. ........................ | 475/259 X |
| 5,482,512 | 1/1996 | Stevenson ............................ | 475/269 X |
| 5,507,704 | 4/1996 | Lasoen ..................................... | 475/295 |
| 5,538,481 | 7/1996 | Friedmann .......................... | 475/317 X |

FOREIGN PATENT DOCUMENTS

| | | |
|---|---|---|
| 879 518 | 6/1953 | Germany . |
| 1 023 338 | 1/1958 | Germany . |
| 1 126 212 | 9/1962 | Germany . |
| 1 236 890 | 3/1967 | Germany . |
| 28 46 917 | 4/1980 | Germany . |
| 33 20 431 A1 | 12/1983 | Germany . |
| 34 10 475 A1 | 9/1985 | Germany . |
| 37 43 634 A1 | 7/1988 | Germany . |
| 39 08 225 A1 | 9/1990 | Germany . |
| 40 00 833 C2 | 11/1992 | Germany . |
| 2 156 014 | 10/1986 | United Kingdom . |
| 89/08796 | 9/1989 | WIPO . |

Primary Examiner—Charles A. Marmor
Assistant Examiner—Peter T. Kwon
Attorney, Agent, or Firm—Shinjyu An Intellectual Property Firm

[57] ABSTRACT

A clutch mechanism disposed between an engine (2) and a transmission (3) includes an input part (10) supplied with torque from the engine (2), an output shaft (11) of the transmission (3), a planetary gear train (12) and a clutch device having clutches (13) and (14). The planetary gear train (12) has a sun gear (31), planetary gears (32) meshing with the sun gear (31), a carrier (34) carrying the planetary gears (32), and an ring gear (33) meshing with the planetary gears (32). The clutch device is operable to selectively engage and disengage portions of the planetary gear train (12) such that one of two differing power transmission paths may be used to transmit torque. One power transmission path transmits torque at a lower speed than the other transmission path.

6 Claims, 7 Drawing Sheets

Fig.5

| | THE FIRST CLUTCH | THE SECOND CLUTCH |
|---|---|---|
| TORQUE INTERRUPTION | OFF | OFF |
| SPEED REDUCTION | OFF | ON |
| DIRECT COUPLING | ON | OFF |

Fig.7

|  | THE FIRST CLUTCH | THE SECOND CLUTCH |
|---|---|---|
| TORQUE INTERRUPTION | OFF | OFF |
| SPEED REDUCTION | OFF | ON |
| DIRECT COUPLING | ON | OFF |

CLUTCH APPARATUS HAVING PLANETARY GEAR MECHANISM

BACKGROUND OF THE INVENTION

A. Field of the Invention

The present invention relates to a clutch apparatus for use in automotive applications between an engine and a manual transmission. More specifically, the clutch apparatus includes a planetary gear mechanism which allows for selective changing of torque speed transmission separate from the gear changing process in the manual transmission.

B. Description of the Background Art

In general, a clutch device is typically disposed between an engine and a manual transmission in an automotive vehicle for selectively transmitting and interrupting transmission of torque therebetween.

The clutch device includes a clutch disk assembly which is urged into contact against the flywheel, and a clutch cover assembly for selectively engaging and disengaging the clutch disk assembly with respect to the flywheel.

In this clutch device, the clutch disk assembly is pressed against the flywheel to transmit torque from the engine to the manual transmission when a clutch pedal is not depressed by an operator. When the clutch pedal is pressed by an operator, the clutch cover assembly releases the clutch disk assembly from the flywheel, so that the torque is not transmitted from the engine to the manual transmission.

As described above, the clutch device in the prior art has only one function, specifically, that of selectively transmitting and interrupting the torque transmission from the engine.

The size and power requirements of vehicles is constantly changing. Consequently, market forces have demanded that the take-off, acceleration and top speed performances vehicle be improved. One way of improving these performances is to increase the power output of the engine. Such power output increases typically include a corresponding increase in mass and size of the engine. Another way to increase such performances is to increase the number of gear speeds or gear ratio combinations within the transmission. There are several problems associated with such improvements to the transmission. Such problems include an increased number of gears, a possible increase in size of the transmission and more importantly, an increase in manufacturing cost.

SUMMARY OF THE INVENTION

One object of the invention is to increase the number of gear ratio speeds through which engine torque is outputted without increasing the space required for positioning of an engine, clutch and transmission in an automotive vehicle.

In accordance with one aspect of the present invention, a clutch mechanism includes a casing disposed between an engine and a manual transmission and an input part disposed within the casing for receiving torque from the engine. An output part is coupled to the manual transmission for transmitting torque thereto. A planetary gear train is operably disposed between the input part and the output part the planetary gear train including a sun gear, planetary gears meshing with the sun gear, a carrier supporting the planetary gears, and an ring gear meshing with the planetary gear. A clutch device disposed adjacent to the planetary gear train for selectively engaging and disengaging the planetary gear train to provide two differing torque transmission speeds to the transmission.

Preferably, the carrier is engaged with the output part for rotation therewith and the sun gear is engaged with the input part for rotation therewith.

Preferably, the clutch device includes a first and a second clutch mechanism wherein the first clutch mechanism selectively couples the sun gear and the carrier such that when coupled the carrier rotates with the sun gear. The second clutch mechanism selectively couples the casing and the ring gear such that when coupled rotation of the ring gear relative to the casing is restricted.

Preferably, the input part includes a flywheel connected to a crankshaft of the engine and a damper device, the damper device further connected to the sun gear such that the damper device allows for limited relative rotation between the flywheel and the sun gear.

Preferably, the first and second clutches are hydraulically controlled.

Alternatively, the sun gear may be engaged with the output part for rotation therewith and the carrier is engaged with the input part for rotation therewith.

Preferably, the clutch device includes a first and a second clutch mechanism wherein the first clutch mechanism selectively couples the sun gear and the carrier such that when coupled the carrier rotates with the sun gear. The second clutch mechanism selectively couples the casing and the ring gear such that when coupled rotation of the ring gear relative to the casing is restricted.

Preferably, the input part comprises a flywheel connected to a crankshaft of the engine and a damper device, the damper device further connected to the carrier such that the damper device allows for limited relative rotation between the flywheel and the carrier.

Preferably, the first and second clutches are hydraulically controlled.

The configuration of the clutch device according to the present invention is such that it is possible to select either one of two differing power transmission paths through the planetary gear train. One power transmission path provides a reduced torque transmission speed compared to the other power transmission path without any change in engine torque speed or shifting of gears in the transmission.

In the power transmission device according to the present invention, the planetary gear train changes the speed of the rotation received from the input part, and transmits the same to the output part. In this operation, the clutch device can operate to select the power transmission paths in the planetary gear train, so that the power can be interrupted or the speed can be changed.

Since the above structure utilizes the planetary gear train and the clutch device, the structure can be arranged within the same space as that occupied by a conventional clutch, and therefore, an auxiliary speed change mechanism other than the manual transmission but including the clutch device can be disposed in the same amount of space normally taken up by a clutch and transmission arrangement without a planetary gear train.

The foregoing and other objects, features, aspects and advantages of the present invention will become more apparent from the following detailed description, when taken in conjunction with the accompanying drawings.

BRIEF DESCRIPTION OF THE DRAWINGS

FIG. 5 is a table showing operational control of the clutch mechanism shown in FIG. 1;

FIG. 7 is a table showing operational control of the clutch mechanism shown in FIG. 6.

DESCRIPTION OF THE PREFERRED EMBODIMENTS

Figure 1:
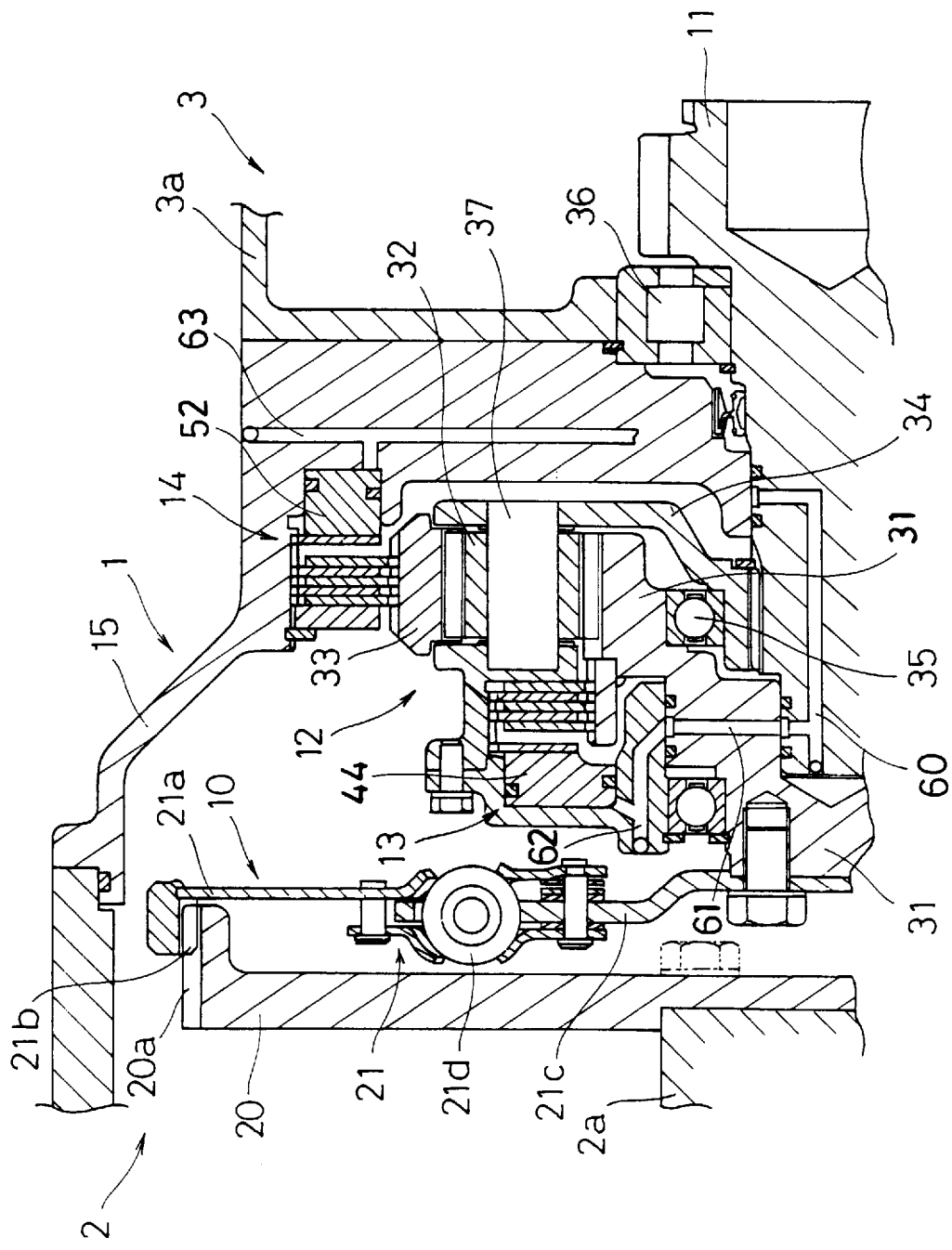
FIG. 1 is a fragmentary, cross sectional view showing a clutch mechanism in accordance with one embodiment of the present invention where the clutch mechanism includes a planetary gear train.

A clutch mechanism 1, in accordance with one embodiment of the invention shown in FIG. 1, is arranged between an engine 2 and a transmission 3 (i.e., manual transmission). With respect to FIG. 1, the left side of the clutch mechanism 1 in FIG. 1 will hereinafter be referred to as the engine side and the right side of the clutch mechanism 1 will be referred to as the transmission side.

The clutch mechanism 1 has an input part 10 receiving a rotation from the engine 2, an output shaft 11, i.e., output part coupled to an input shaft of the transmission 3, a planetary gear train 12 arranged between the input part 10 and the output shaft 11, and first and second clutches 13 and 14 for changing or selecting power transmission paths in the planetary gear train 12. These components are accommodated in a clutch housing 15.

The input part 10 has a flywheel 20 fixed to a crank shaft 2a of the engine, and a damper device 21 arranged between the flywheel 20 and the planetary gear train 12. Outer teeth 20a are formed at the outer periphery of the flywheel 20. The damper device 21 has a drive plate 21a, a member 21b having radially inwardly extending gear teeth engaged with the outer periphery of the drive plate 21a and meshing with the outer teeth 20a of the flywheel 20, a driven plate 21c, and torsion springs 21d elastically coupling the drive and driven plates 21a and 21c.

Figure 2:
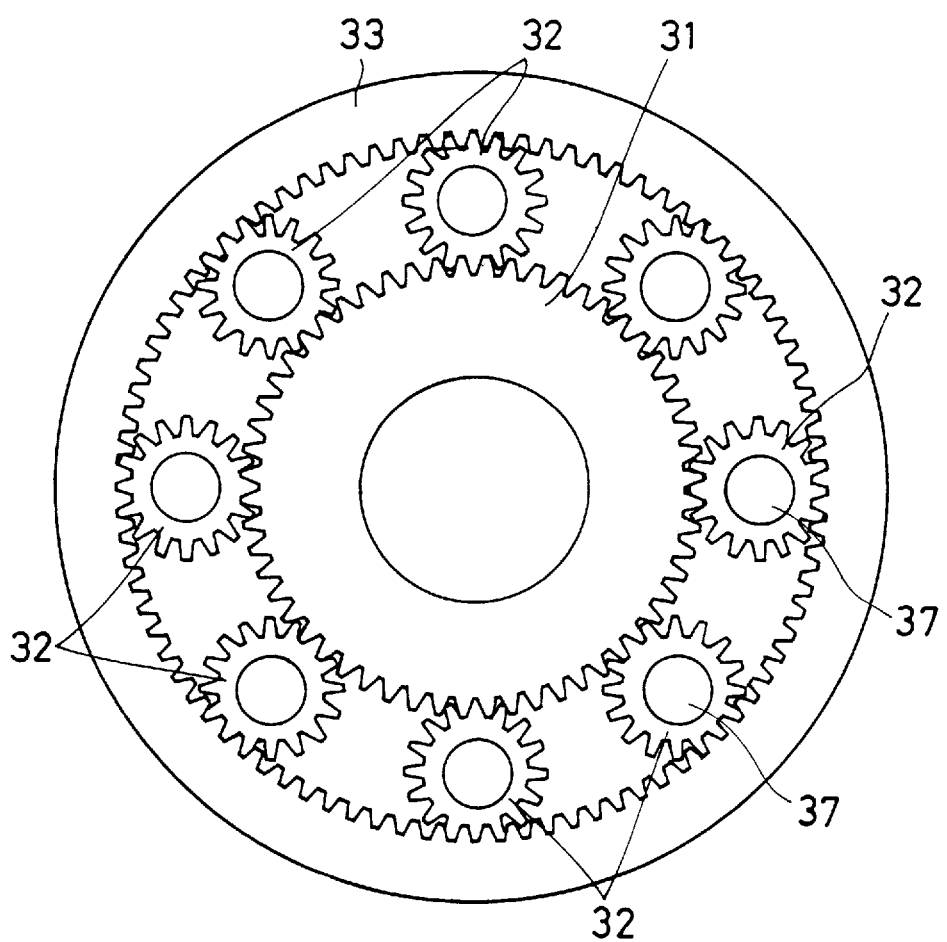
FIG. 2 is an end elevation of the planetary gear train depicted in FIG. 1, where the planetary gear train is shown removed from the clutch mechanism.

The planetary gear train 12 has a sun gear 31, a plurality of planetary gears 32 meshing with the sun gear 31, a ring-shaped ring gear 33 having gear teeth on an inner radial surface meshing with the planetary gears 32, and a carrier 34 spline-coupled to the output shaft 11. The sun gear 31 is supported by the carrier 34 and the output shaft 11, but the sun gear 31 is rotatable about the output shaft 11 and the carrier 34 via a bearing 35. The output shaft 11 is supported in a casing 3a of the transmission 3, but the output shaft 11 is rotatable with respect to the casing 3a via a bearing 36. The driven plate 21c is fixed to an end of the sun gear 31 near the engine. The planetary gears 32 are eight in number, as shown in FIG. 2, and are arranged between the sun gear 31 and the ring gear 33. Each of the planetary gears 32 are supported on carrier shafts 37. The carrier shafts 37 extend through bores formed in the carrier 34 such that the planetary gears 32 may rotate within the carrier 34.

The first clutch 13 is arranged between the sun gear 31 and the carrier 34 for selectively transmitting and interrupting the power between them. As shown on an enlarged scale in FIG. 3, the first clutch 13 has a plurality of disk plates 40, driven plates 41, a clutch housing 43 fixed to the carrier 34 and rotatably carried by the sun gear 31 via a bearing 42, and a piston 44 disposed within the clutch housing 43. Each disk plate 40 is provided at its inner periphery with spline teeth engaged with spline teeth formed at the sun gear 31, and has opposite side surfaces covered with friction surfaces fixed thereto. Each driven plate 41 is provided at its outer periphery with spline teeth meshing with spline teeth formed at the carrier 34.

The second clutch 14 is disposed radially outward from and around the ring gear 33, and is selectively operable to stop rotation of the ring gear 33 with respect to the clutch housing 15 and allow free rotation of the same. The second clutch 14 has a plurality of disk plates 50, driven plates 51, a piston 52 for urging these plates against each other. Each disk plate 50 has spline teeth at its inner periphery, which mesh with spline teeth formed at the outer periphery of the ring gear 33, and has opposite side surfaces covered with friction surfaces fixed thereto. Each driven plate 51 has spline teeth at its outer periphery, which mesh with spline teeth formed at the clutch housing 15.

Figure 3:
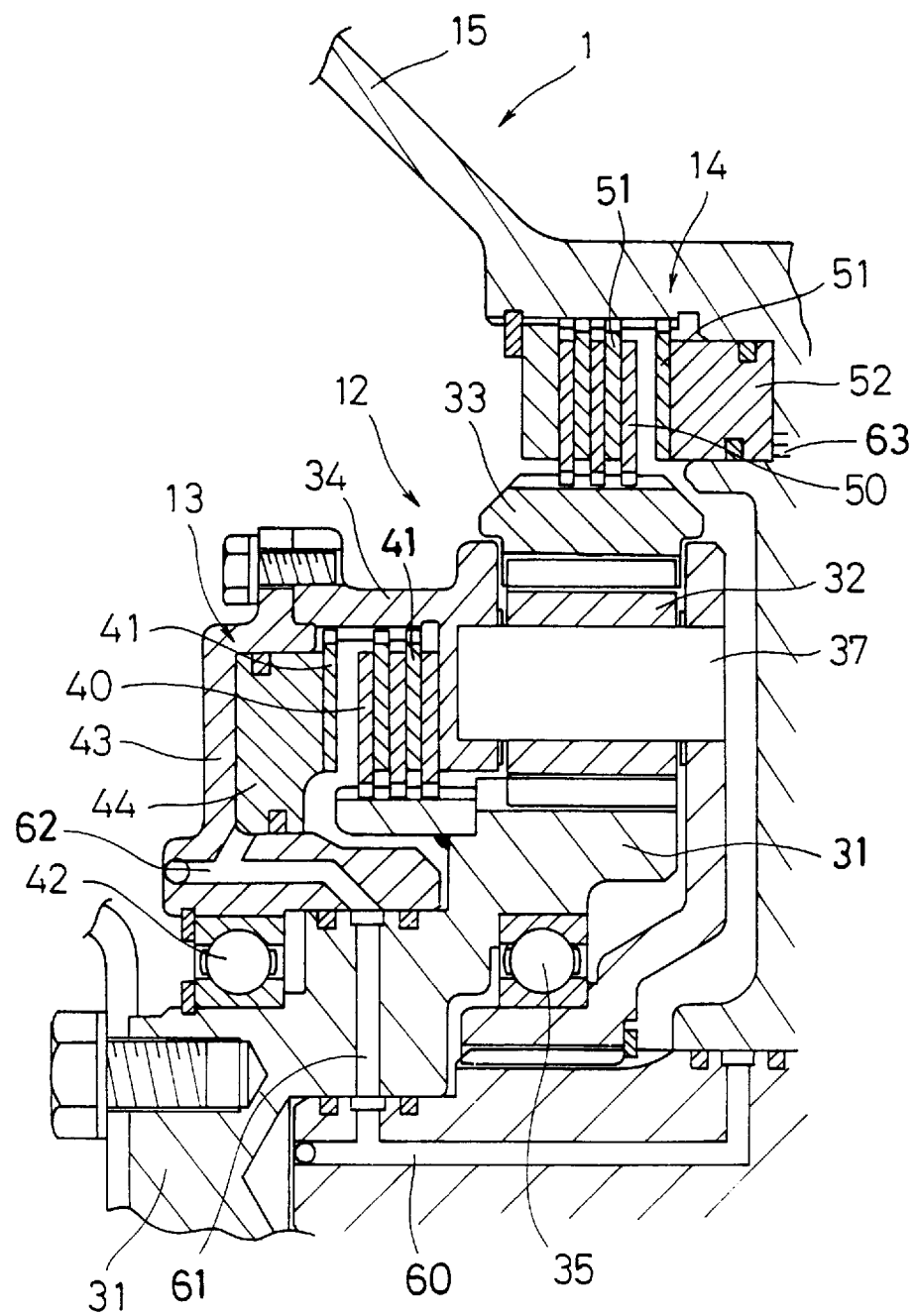
FIG. 3 is a fragmentary, cross sectional view showing a portion of the clutch mechanism device depicted in FIG. 1 on a slightly enlarged scale.

The output shaft 11 is formed with a hydraulic passage 60, shown in FIGS. 1 and 3. The passage 60 is in communication with a hydraulic pressure controller (not shown). The passage 60 is further connected to passages 61 and 62 formed in the sun gear 31 and the clutch housing 43, respectively. The passage 62 allows hydraulic fluid to act on the piston 44. The casing 3a is formed with a passage 63 which is further connected to a hydraulic pressure controller (not shown). The passage 63 allows hydraulic fluid to act on the piston 52. Engagement and disengagement of the clutches 13 and 14 are controlled by manipulation of hydraulic pressure provided to the pistons 44 and 52 by an operator of the vehicle equipped with the present invention.

An operation will be described below.

Figure 4:
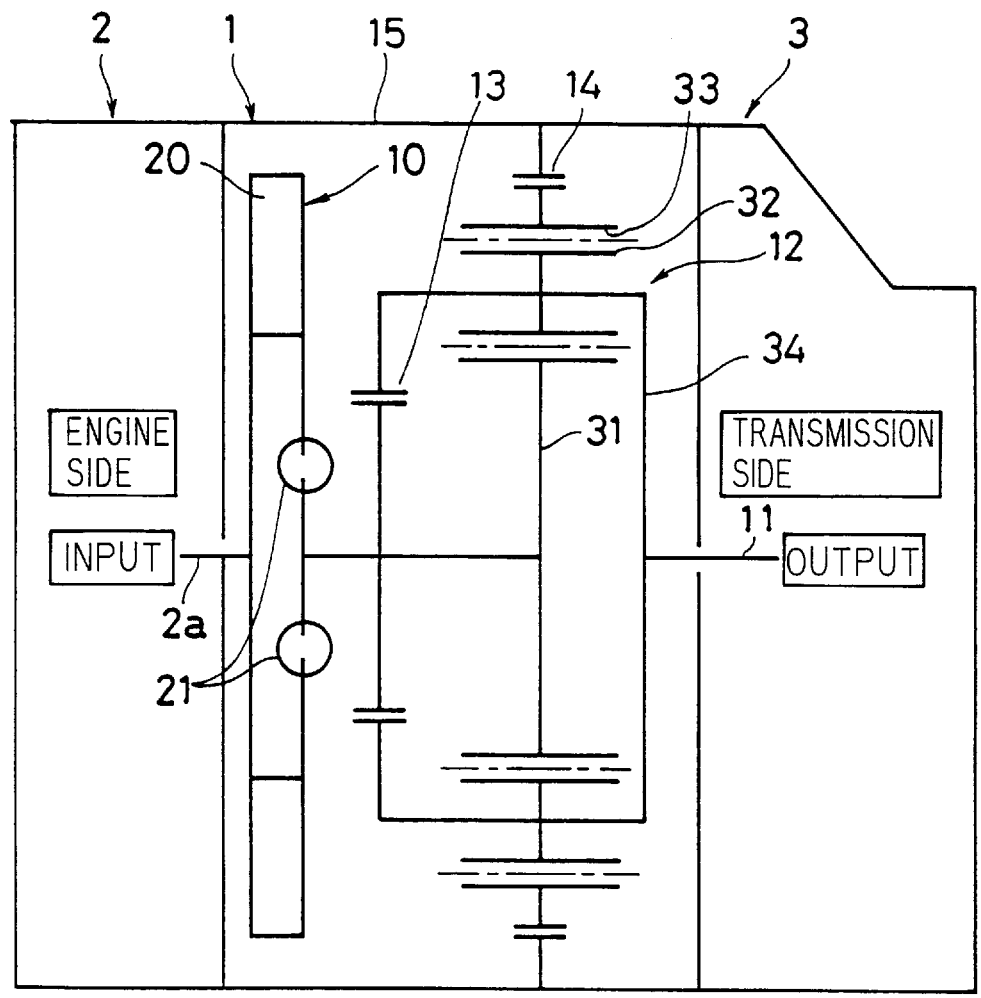
FIG. 4 is a schematic drawing of the clutch mechanism depicted in FIG. 1.

FIG. 4 schematically shows the clutch mechanism 1 shown in FIG. 1.

Torque Disengagement

In order to disengage torque transmission from the engine 2 to the transmission 3, both the first and second clutches 13 and 14 are disengaged (off) as shown in FIG. 5. The clutches 13 and 14 can be disengaged by releasing hydraulic pressure acting the pistons 44 and 52 of the clutches 13 and 14, respectively. In this state (shown in FIG. 3), the power of the engine is transmitted to the sun gear 31 through the input part 10. However, the sun gear 31, planetary gears 32 and ring gear 33 rotate around their own axes, respectively, because both the clutches 13 and 14 are disengaged. Thus, the carrier 34 and the output shaft 11 do not rotate. In this state, the rotation is not transmitted from the engine 2 to the transmission 3.

Speed Reduction

In order to transmit torque from the engine 2 to the transmission 3 at a reduced speed, the first clutch 13 is disengaged (off), and the second clutch 14 is engaged (on). Thus, an oil pressure is applied only to the piston 52 of the second clutch 14 via the passage 63. Thereby, the disk plates 50 and drive plates 51 in the second clutch 14 are pressed against each other, so that the ring gear 33 is fixed to the clutch housing 15. In this case, when the sun gear 31 rotates, the sun gear 31 and the planetary gears 32 rotate around their own axes, respectively, and the planetary gears 32 also revolve around the sun gear 31 while the ring gear 33 is fixed in place with respect to the casing 3a. Thereby, the rotation from the engine 2 is reduced in speed at a reduction ratio depending on the numbers of teeth of the sun gear 31 and ring gear 33, and is transmitted to the transmission 3 through the carrier 34 and the output shaft 11.

Direct Coupling

The rotation can be transmitted from the engine 2 to the transmission 3 without a torque speed reduction. In this case, the first clutch 13 is engaged, and the second clutch 14 is disengaged. More specifically, an oil pressure is applied only to the piston 44 of the first clutch 13 to press the disk plates 40 and the driven plates 41 of the first clutch 13 against each other. In this state, the ring gear 33 can freely rotate with respect to the clutch housing 15, so that the rotation supplied to the sun gear 31 is transmitted to the output shaft 11 through the first clutch 13 and the carrier 34. Thus, by engaging the clutch 13 and disengaging the clutch 14, the speed of torque transmission from the engine to the transmission can be increased without a gear change in the transmission.

Alternate Embodiment

Figure 6:
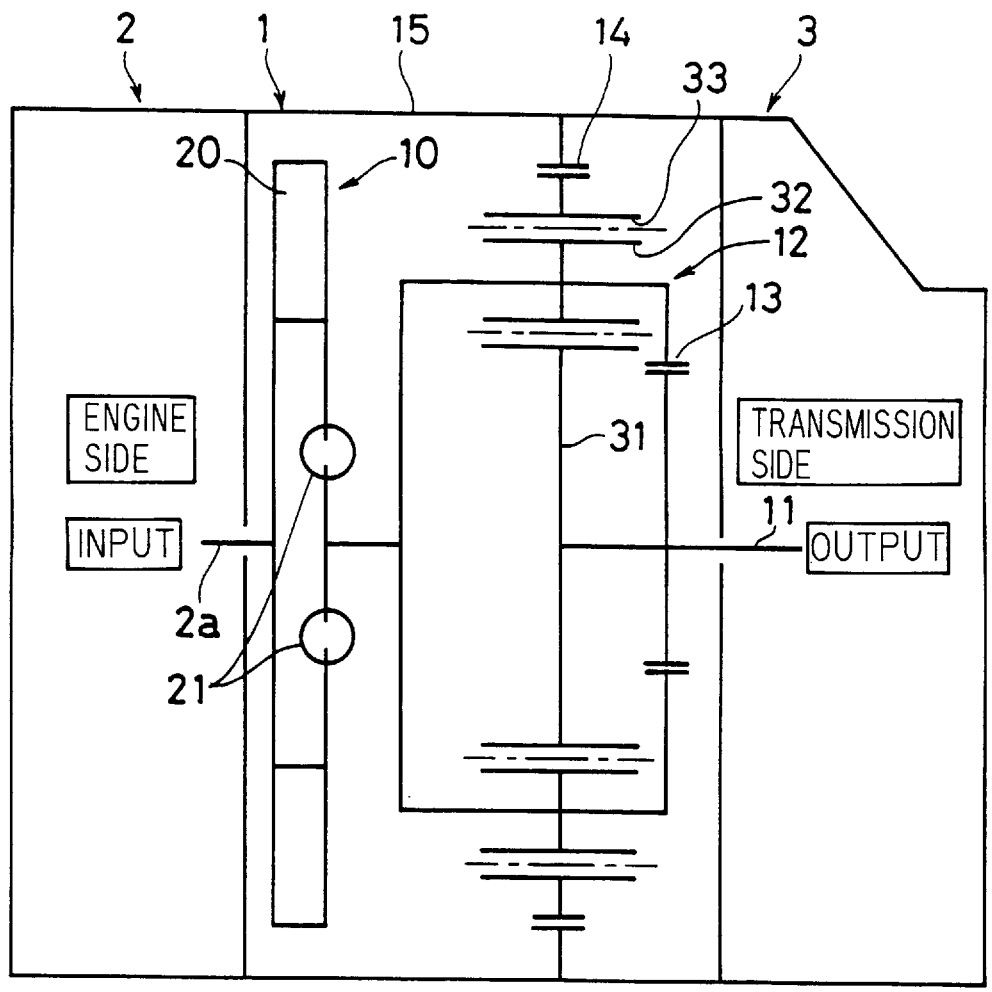
FIG. 6 is a schematic drawing of a clutch mechanism in accordance with an alternate embodiment of the present invention.

Another embodiment is schematically shown in FIG. 6.

In this embodiment, the input part 10 supplies the power to the carrier 34, and the first clutch 13 is arranged between the carrier 34 and the output shaft 11. The sun gear 31 is fixed to an end of the output shaft 11 near the engine. Thus, the power of the engine 2, which is supplied through the planetary gears 32 (carrier 34), is transmitted through the sun gear 31 for transmission at an increased speed, or is directly transmitted through the first clutch 13. Structures other than the above are the same as those of the foregoing embodiment.

In this structure, as shown in FIG. 7, the first clutch 13 is disengaged and the second clutch 14 is engaged, whereby the rotation supplied from the engine can be transmitted to the transmission 3 after increasing the speed at a ratio which depends on the numbers of teeth of the sun gear 31 and the ring gear 33, in contrast to the foregoing embodiment.

According to the invention, as described above, the planetary gear train and the clutch device can be disposed within the same space normally occupied by a conventional clutch device alone. Therefore, the present invention makes it possible for an auxiliary speed change mechanism, such as that of the present invention, to be used instead of a prior art clutch device with a transmission without increasing the space occupied by such devices, thus improving the performance of the vehicle.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A clutch mechanism comprising:

a casing disposed between an engine and a manual transmissions;

an input part disposed within said casing for receiving torque from the engine;

an output part coupled to the manual transmission for transmitting torque thereto;

a planetary gear train operably disposed between said input part and said output part, said planetary gear train including a sun gear, planetary gears meshing with said sun gear, a carrier supporting said planetary gears and a ring gear meshing with said planetary gear;

a clutch device disposed adjacent to said planetary gear train for selectively engaging and disengaging said planetary gear train to provide two differing torque transmission speeds to the manual transmission;

wherein said carrier is engaged with said output part for rotation therewith an said sun gear is engaged with said input part for rotation therewith and said input part comprises a flywheel connected to a crankshaft of the engine and a damper device, said damper device further connected to said sun gear such that said damper device allows for limited relative rotation between said flywheel and said sun gear.

2. The clutch mechanism as in claim 1, wherein said clutch device includes a first and a second clutch mechanism wherein:

said first clutch mechanism selectively couples said sun gear and said carrier such that when coupled said carrier rotates with said sun gear; and said second clutch mechanism selectively couples said casing and said ring gear such that when coupled rotation of said ring gear relative to said casing is restricted.

3. The clutch mechanism as in claim 1, wherein said first and second clutches are hydraulically controlled.

4. The clutch mechanism as in claim 1, wherein said sun gear is engaged with said output part for rotation therewith and said carrier is engaged with said input part for rotation therewith.

5. A clutch mechanism comprising:

a casing disposed between an engine and a manual transmission;

an input part disposed within said casing for receiving torque from the engine;

an output part coupled to the manual transmission for transmitting torque thereto;

a planetary gear train operably disposed between said input part and said output part, said planetary gear train including a sun gear, planetary gears meshing with said sun gear, a carrier supporting said planetary gears, and an ring gear meshing with said planetary gear;

a clutch device disposed adjacent to said planetary gear train for selectively engaging and disengaging said planetary gear train to provide two differing torque transmission speeds to the manual transmission;

wherein said sun gear is engaged with said output part for rotation therewith and said carrier is engaged with said input part for rotation therewith, said clutch device includes a first and a second clutch mechanism such that said first clutch mechanism selectively couples said sun gear and said carrier such that when coupled said carrier rotates with said sun gear; and said second clutch mechanism selectively couples said casing and said ring gear such that when coupled rotation of said ring gear relative to said casing is restricted; and said input part comprises a flywheel connected to a crankshaft of the engine and a damper device, said damper device further connected to said carrier such that said damper device allows for limited relative rotation between said flywheel and said carrier.

6. The clutch mechanism as in claim 5, wherein said first and second clutches are hydraulically controlled.

* * * * *